May 29, 1923.  1,457,141

W. L. BOCKOVER ET AL

MAT

Filed Jan. 12, 1922

W. L. Bockover
J. W. McNamara
Inventors

By C. A. Snow & Co.
Attorneys

Patented May 29, 1923.

1,457,141

UNITED STATES PATENT OFFICE.

WALTER L. BOCKOVER AND JOHN W. McNAMARA, OF TIPTON, INDIANA.

MAT.

Application filed January 12, 1922. Serial No. 528,830.

*To all whom it may concern:*

Be it known that we, WALTER L. BOCKOVER and JOHN W. MCNAMARA, citizens of the United States, residing at Tipton, in the county of Tipton, State of Indiana, have invented a new and useful Mat, of which the following is a specification.

This invention relates to mats to be used in connection with automobile floor boards, the primary object of the invention being to provide a mat having novel means to provide an air-tight connection between the pedals and walls of the slots formed in the mat, and in which the pedals move.

Another object of the invention is to provide a floor mat having flexible fingers, the fingers being inclined to permit the pedals to contact with the upper and lower faces thereof to eliminate lateral movement of the fingers when the pedals are being moved in their slots.

A still further object of the invention is to provide means which will closely engage the pedal shanks to entirely close the openings around the pedal shanks, regardless of the positions of the pedals.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
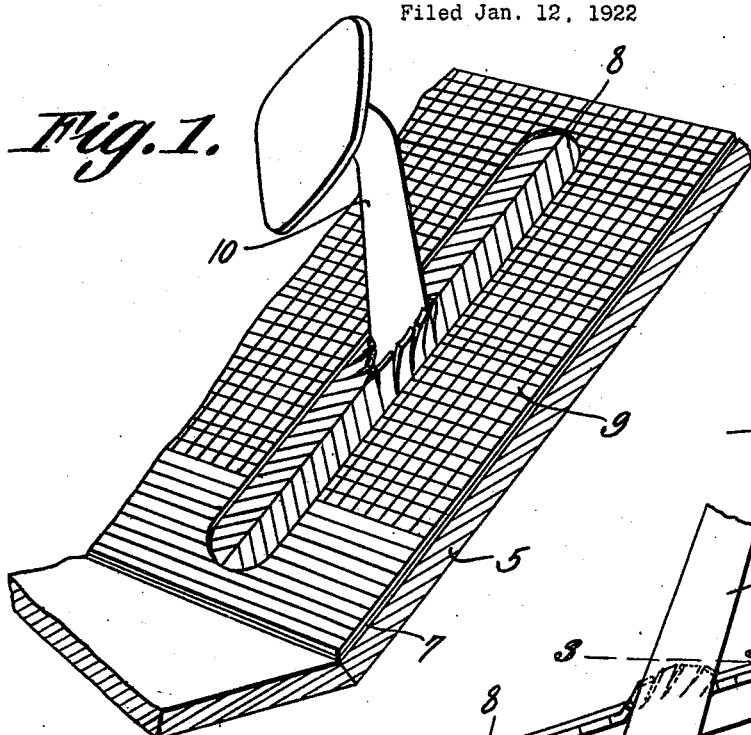
Figure 1 is a perspective view disclosing a portion of a floor board, the mat constructed in accordance with the present invention being applied thereto.
Figure 2:
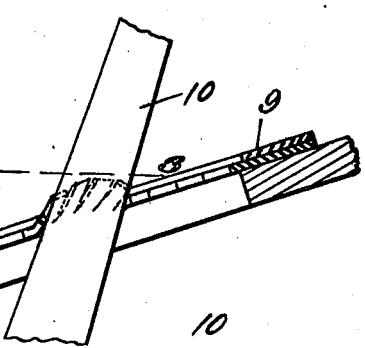
Figure 2 is a sectional view through the floor board and mat.
Figure 3:
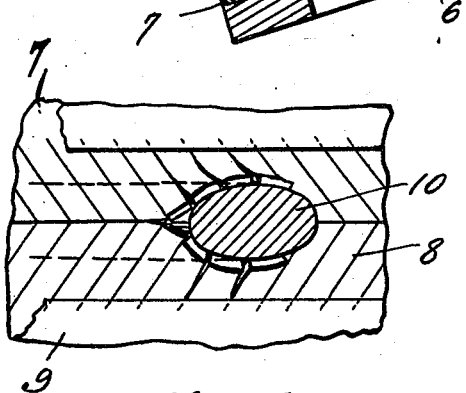
Figure 3 is a sectional view taken approximately on line 3—3 of Figure 2.
Figure 4:
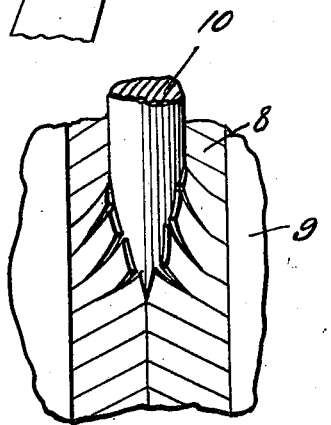
Figure 4 is an elevational view of the mat.

Referring to the drawing in detail, the reference character 5 designates the inclined portion of a floor board, which is formed with the usual pedal shank slots 6, in which the pedal shanks move to control the operation of the vehicle.

The mat, forming the essence of the invention is indicated at 7, and is formed preferably of rubber, a portion of the mat being cut to provide inclined fingers 8 which have their adjacent ends and edges normally contacting to close the slots or openings over which the same are positioned.

A cover plate of flexible material is indicated at 9, and is formed with a relatively wide slot, the walls or edges thereof lying directly over the fingers 8 at points in spaced relation with the ends thereof, so that when a shank moves through its slot, the cover plate 9 contacting with the upper portions of the fingers will tend to exert a pressure on the same to hold them to the shank of the pedal, which in the present drawing, is indicated at 10.

From the foregoing it will be seen that due to the inclinations of the fingers 8, the fingers will lie in close proximity to the pedal shank associated therewith, and the fingers at the rear of the shank will closely engage the rear edge of the shank to entirely close the opening in which the pedal shank moves.

Having thus described the invention, what is claimed as new is:—

In combination with a pedal shank and the walls of the slot in which the same operates, a floor mat including a plurality of flexible fingers inclined towards one end of the slot, and a cover plate having an opening and adapted to be positioned on the mat, and said fingers adapted to closely engage the pedal shank.

In testimony that we claim the foregoing as our own, we have hereto affixed our signatures in the presence of two witnesses.

WALTER L. BOCKOVER.
JOHN W. McNAMARA.

Witnesses:
H. J. O'NEILL,
CLYDE C. BROWN.